Feb. 27, 1962 W. R. AIKEN 3,023,316

ELECTRONIC DEVICE

Filed Oct. 23, 1956 3 Sheets-Sheet 1

INVENTOR

WILLIAM R. AIKEN

BY James E. Toomey

ATTORNEY

Feb. 27, 1962 W. R. AIKEN 3,023,316

ELECTRONIC DEVICE

Filed Oct. 23, 1956 3 Sheets-Sheet 2

INVENTOR
WILLIAM R. AIKEN

BY James E. Toomey

ATTORNEY

INVENTOR
WILLIAM R. AIKEN

BY James E. Toomey

ATTORNEY 3,023,316

ELECTRONIC DEVICE

William Ross Aiken, Los Altos, Calif., assignor, by mesne assignments, to Kaiser Industries Corporation, a corporation of Nevada Filed Oct. 23, 1956, Ser. No. 617,878
10 Claims. (Cl. 250—217)

Figure 1:
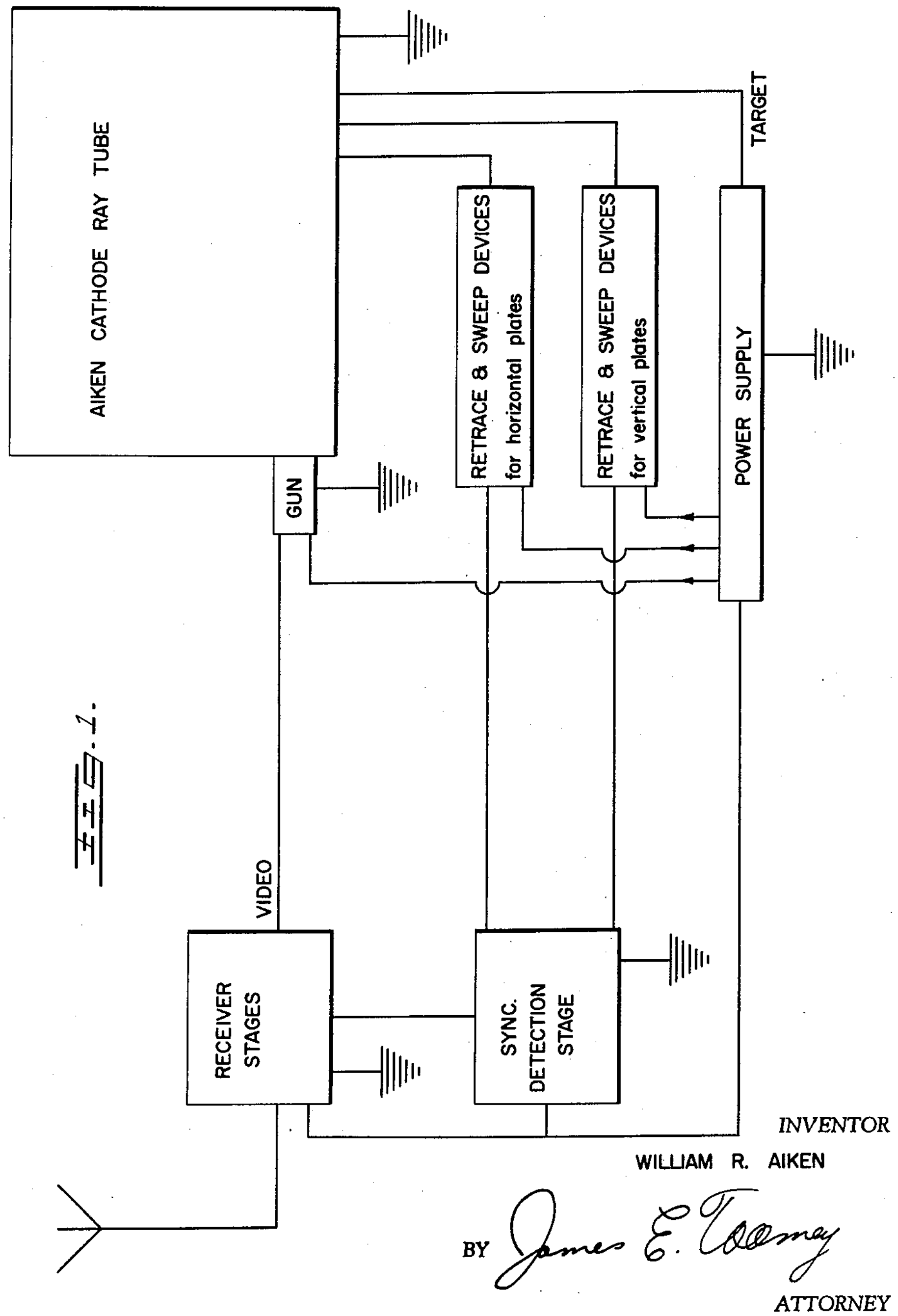

The present invention relates to electrical control apparatus and more particularly to a switching control device having a plurality of light sensitive conducting elements which are caused to be impinged by a source of light to effect corresponding potential variations on associated circuitry electrically connected thereto.

The apparatus comprising the present invention is particularly useful in connection with the application of operating signals to the deflection elements of a cathode ray tube of the type disclosed and described in applicant's copending application Serial Number 355,965, filed May 9, 1953, now abandoned, and Serial Number 396,120, filed December 4, 1953 entitled, "Cathode Ray Tube," which issued June 11, 1957 as Patent No. 2,795,731 and is assigned to the assignee of the present invention.

An object of the invention is to produce a signal device capable of controlling the application of signal voltages sequentially to the elements of the horizontal and the vertical deflection systems of a television receiver of the type referred to above.

Another object of the invention is to produce a control apparatus which is readily adapted for use in electrical systems in which the application of signal voltages to successive ones of associated circuits is desirable.

Still another object of the invention is to produce a control apparatus suitable for delivering an output potential waveform of a predetermined shape and frequency over a plurality of associated circuits in a given sequence.

A further object of the invention is to produce an electrical control apparatus which is compact in size and may be suitably disposed within the envelope of a cathode ray tube of the type referred to hereinabove.

The electronics field has had a manifest need for a small compact control element which is capable of effecting sequential or simultaneous control of a plurality of a member of slave circuits. As a specific example of an application for such type control element, reference is made to the novel Aiken-type cathode ray tube which is set forth in the above-noted copending application and patent. In such tube arrangement, a series of horizontal deflection plates and a series of vertical deflection plates are cyclically energized in a given synchronized sequence and relation to produce a raster on a target plate. A video signal may be presented on the raster by applying video signals to the tube control grid in the conventional manner.

In the use of the novel cathode ray tube arrangement as a commercial television receiver, a first control device is connected to the vertical deflection plates to cyclically effect the application of a changing potential signal to the successive vertical deflection plates, and subsequent to the completion of each cycle a second control device is connected to the vertical deflection plates to effect the application of the high potential to the plates simultaneously to achieve the retrace. The two control devices in such an arrangement will, of course, have synchronized time cycling periods, and will have a number of radiation responsive elements equivalent in number to the number of deflection plates to be controlled thereby.

If desired, of course, the control arrangement for the cathode ray tube may utilize a set of the novel control devices to control the vertical deflection plates and a set to control the horizontal deflection plates.

In other applications, as for example, certain radar embodiments which are arranged to present target positions on a coordinate type screen, the control devices for the horizontal and vertical deflection plates may have cycling periods peculiar to the application.

In certain embodiments of the Aiken-type cathode ray tube, it is advantageous to effect an overlapping energization of each of the deflection plates of a set. That is, the energization of the next plate in an operating sequence is initiated before the prior plate in the sequence reaches its maximum value of energization. A feature of the present invention is the manner in which the overlapping operation is readily accomplished by the employment of the instant novel control device.

In its broadest scope, the present invention contemplates an envelope having disposed therewithin a plurality of radiation responsive elements arranged on the inner surface of the envelope in such a fashion that the longitudinal axes of the elements extend generally parallel to the longitudinal axis of the envelope. Each of the radiation responsive elements is connected from one side thereof to one of the deflection plates of an Aiken-type tube or any other slave circuit to be controlled. The other side may be connected by means of a common lead to ground. A similar control device is electrically connected between the deflection plates and a source of high voltage. Disposed coaxially within the cylindrical displacement of the plurality of radiation responsive elements, there is a light source adapted to be pulsed on and off in any cyclic manner desired.

Basically, the operations are such that as the light sources of the respective control devices is pulsed "on" the light emanating therefrom will be caused to impinge on the radiation responsive elements thereby effecting a change in their electrical resistance characteristics.

In its generic sense, the invention comprises a control device for controlling the value of the resistance in an electrical circuit comprising a housing including a radiation responsive element which is operative to change the resistance to the flow of electrical current in response to the application of different light intensities thereto, a light source having an output of variable intensities, and means extending exteriorly of the housing for connecting the radiation responsive elements in an electrical circuit.

Figures 2, 3, 4:
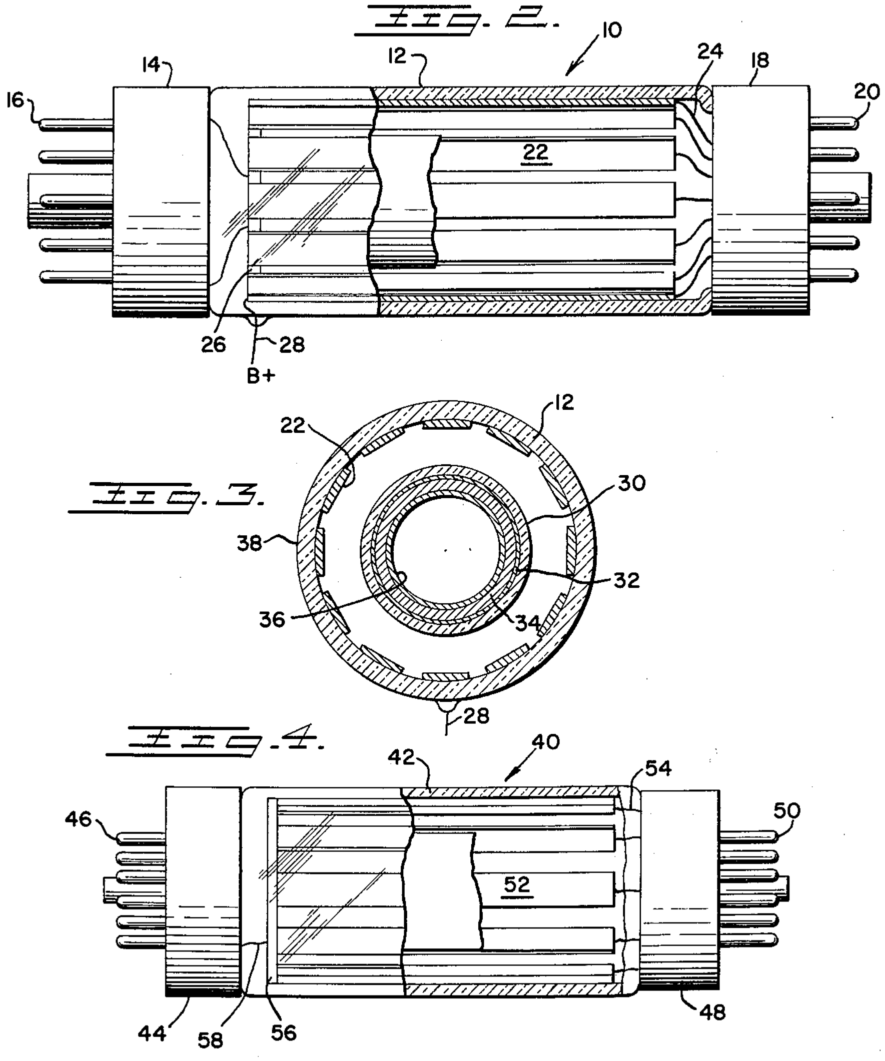
Figure 5:
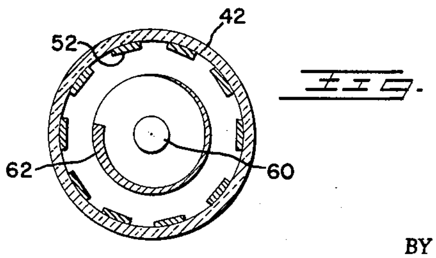
Figure 7:
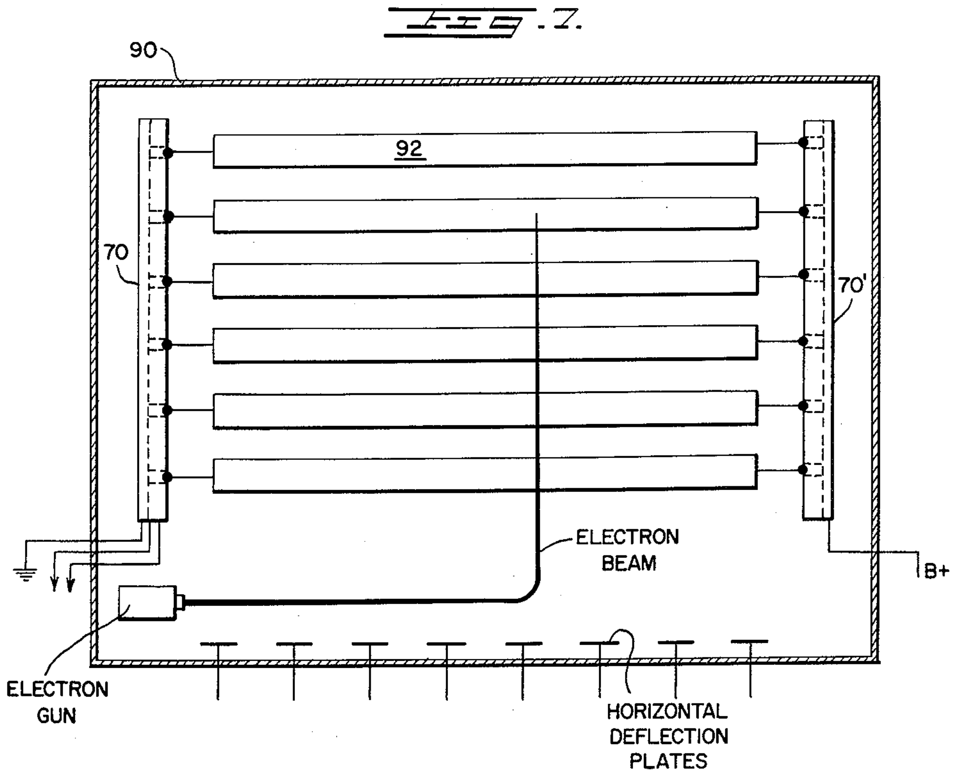
Figure 6:
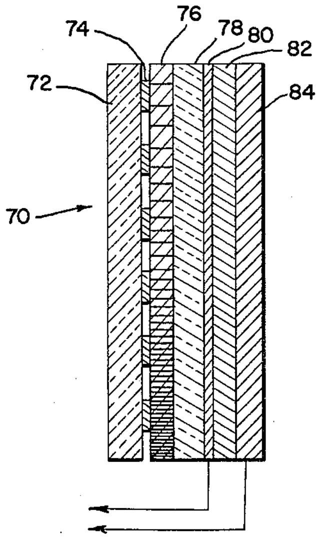

The specific nature of the structure and its operation will be apparent with reference to the following description and claims and drawings, in which FIGURE 1 is a block diagram showing a system incorporating the control devices of the instant invention, FIGURE 2 is a side view of one embodiment of the control device partially cut-away to enable a complete disclosure of the internal components, FIGURE 3 is a sectional view of the control device illustrated in FIGURE 2, FIGURE 4 is a side view partially cut-away of another embodiment of the control device employing a variable density light filter disposed intermediate the light source and the radiation responsive elements, FIGURE 5 is a sectional view of the control device illustrated in FIGURE 4, FIGURE 6 is a view of another embodiment of the control device wherein the electro-luminescent phosphor, light filter, and radiation responsive elements are formed as a series of superposed laminates, and FIGURE 7 is a diagrammatic view of an Aiken-type flat cathode ray tube wherein the control devices of the instant invention are adapted to be disposed within the tube envelope.

There is set forth initially herein, a teaching of the manner in which the control devices of the instant invention may be utilized to apply control or deflection voltages to the horizontal and vertical deflection elements of an Aiken-type cathode ray tube, such as described and claimed in the above-identified copending applications.

With reference to FIGURE 1, a schematic showing is utilized to teach a system which incorporates the invention in connection with an Aiken-type tube. Basically, the system includes an antenna which is adapted to receive the incoming audio and the video signals, and a set of conventional receiver stages such as the I.F. amplifier, R.F. amplifier, video detector, the video amplification stages, etc. of a conventional television receiver, which are interconnected to the antenna by a suitable transmission line.

For purposes of simplification, only the passage of the video portion of the incoming or received signal through the system is shown and described. The incoming sync signal and the video signal are passed to the electron gun of the Aiken-type tube from the receiver stages. The receiver stages simultaneously pass the incoming signal to the sync detection stage which functions to separate the horizontal and vertical control pulses and applies the same over assigned conductors to the respective control device. The control devices in turn effect the synchronized and sequential energization of the horizontal and vertical deflection means of the Aiken-type tube, the control devices for the horizontal plates having operating characteristics consistent with the provision of the raster horizontal line scan at the common television scanning rate, and the control devices for the vertical plates having operating characteristics which are consistent with the provision of a vertical scan at the commercial television scanning rate. In this manner, the electron beam in the Aiken tube is synchronized with that in the camera tube at the transmitter.

As the beam in the Aiken tube scans the target area of the tube, the video signal applied to the electron gun produces the proper variations in the beam intensity and so reconstructs the television picture element by element and line by line.

A power supply is provided to apply suitable operating potentials to the light sources of the control devices, the receiver stages, the sync detection stage, the electron gun, and the target in the conventional manner.

The invention contemplates two basic embodiments of the control device; the embodiment illustrated in FIGURES 2 and 3 is employed to control the retrace of an Aiken-type tube and the embodiments illustrated in FIGURES 4, 5, and 6 are employed to control the sweep of an Aiken tube.

Referring to FIGURES 2 and 3, the retrace tube 10 illustrated comprises an envelope 12 having a coating of non-light transmitting material 38 applied to its outer surface. Base members 14 and 18 are disposed at the extremities of the envelope 12 and are provided with electrically conducting pins 16 and 20, respectively.

A plurality of radiation responsive elements 22 is disposed on the inner surface of the envelope 12. These elements may be satisfactorily formed of a material, such as for example, cadmium sulfide which has the unique property of changing its electrical resistivity when impinged by light energy. One end of each of the elements 22 is connected to conducting leads 24 leading to respective ones of the pins 20. The opposite ends of the elements 22 are electrically connected in common to a high voltage lead 28 by means of a conducting collar 26.

An inner glass cylinder 30 is coaxially mounted with the envelope 12 and extends substantially coextensively with the elements 22. An optically transparent and electrically conducting material 32, such as for example stannic chloride, is coated on the inner surface of the glass cylinder 30. An electroluminescent phosphor material 34 is disposed adjacent the conducting material 32. Finally, there is an interior metal cylinder 36 disposed adjacent the phosphor material 34. The cylinder 36 is provided with shiny or highly reflective outside surface in order to reflect any light given off by the phosphor material 34 in an outward direction. Both the conducting material 32 and the metal cylinder 36 are electrically connected to a source of potential through suitable ones of the pins 16 in any of the conventional manners.

It will be understood that the combination of the glass cylinder 30, the conducting coating 32, the phosphor layer 34 and the metal cylinder 36 form a light source. The material employed in the phosphor layer 34 is of the type referred to in the art as electroluminescent phosphor which has the unique properties of giving off light energy upon being excited by the impression of a potential across it.

In order to retain any light given off by the light source, a coating of opaque material 38, such as paint, may be applied to the outer surface of the envelope 12.

The embodiment of the control device illustrated and described in connection with FIGURES 2 and 3 is employed as to effect the desired retrace of an Aiken-type tube, that is, it functions to simultaneously recharge the associated deflection plates. The exact mode of operation will be explained at a later point in the description.

Referring to FIGURES 4 and 5, it will be noted that the control device 40 is similar to the device shown in FIGURES 2 and 3. The device 40 is employed as a sweep control for controlling the energization of the deflection plates of an Aiken-type tube to cause the electron beam to be deflected onto the target. There is a glass envelope 42 provided with a plurality of radiation responsive elements 52 disposed about the inner surface thereof. The terminal portions of the envelope 42 are provided with bases 44 and 48 and their associated set of electrically conducting pins 46 and 50 respectively. One end of each of the radiation responsive elements 52 is electrically connected to associated ones of the deflection elements of an Aiken-type tube through electrical conducting leads 54 and their respective pins 50. The other ends of the elements 52 are connected in common to ground through a conducting collar 56, conductor 58 and its associated one of the pins 46.

A light source generally indicated by reference numeral 60 is disposed coaxially within the envelope 42 and is in length substantially coextensive with the radiation responsive elements 52. The light source 60 may be of the same type described in connection with FIGURES 2 and 3.

There is disposed intermediate the light source 60 and the plurality of elements 52, a variable density optical filter 62. The filter 62 functions to vary the amount of light emitted from the light source 60 which impinges on the various elements 52.

Another modification of the control device illustrated in FIGURES 4 and 5 is shown in connection with FIGURE 6. The control device 70 comprises a glass plate 72 upon one surface of which is coated a plurality of radiation responsive elements 74. A variable density optical filter 76 is disposed adjacent the elements 74. A light source comprised of a stannic chloride layer 80, an adjacent layer of electroluminescent phosphor 82 and an opaque conducting plate 84 adjacent the phosphor layer 82 is spaced from the variable density filter 76 by a glass plate 78. Upon energization of the layer of electroluminescent phosphor 82 by the impression of a potential across it through the energization of the stannic chloride layer 80 and the conducting plate 84, the light caused to be emitted thereby will be transmitted through the variable density filter 76 and impinge on the radiation responsive elements 74. It will be readily apparent that the light impinging on the radiation responsive elements 74 will vary the electrical resistance thereof.

With reference to the operation of the devices, attention is initially directed to the retrace control device 10 illustrated in FIGURES 2 and 3. The radiation sensitive elements 22 are individually connected to the deflection plates of an Aiken-type tube as mentioned above. Also, the other ends of the elements 22 are connected in common to the B+ voltage. To achieve retrace of the Aiken tube, it is necessary to charge up all the deflection plates to their maximum voltage. In order to achieve the maximum charge on the deflection plates, the light source of the device 10 is energized causing light rays to impinge on the radiation responsive elements 22, thereby lowering the electrical resistance of the elements 22 effecting the desired charging of the deflection plates from the B+ through the elements 22. At the instant the deflection plates have reached their maximum value, the light source is extinguished causing the resistance of the elements 22 to return to their initial high resistance.

The mode of operation in connection with the sweeping of the Aiken-type tube is accomplished through the employment of the control device illustrated in FIGURES 4 and 5. The device 40 referred to as a sweeping tube has its radiation responsive elements 52 connected individually to the deflection plates of an Aiken-type tube as mentioned in connection with the specific description mentioned above. The other ends of the elements 52 are connected in common to ground. To achieve the desired sweeping of the Aiken tube, it is necessary to discharge or reduce the voltage on all the deflection plates in succession in an overlapping manner. In order to accomplish the discharge of the plates, the light source of the device 40 is caused to flash on thereby giving off a predetermined amount of light impinges on the radiation responsive elements 52 after being transmitted through the variable density filter 62. The light operates to lower the resistance of the elements 52 and the charge on the deflection plates will then leak off through the common connection 56 to ground.

Thus, an optical filter arranged so that its lightest area is disposed between the light source and the radiation responsive element connected to the topmost deflection plate and its darkest area disposed between the radiation responsive element connected to the lowermost deflection plate, would create an arrangement wherein increasing intensity of the light source would cause each radiation responsive element to lower its resistance progressively commencing from the top of the array down.

Accordingly, it will be apparent that by utilizing the control devices 10 and 40 in connection with an Aiken-type cathode ray tube the energization of the deflection plates may be readily achieved. One specific example of a typical arrangement utilizing the control devices of the instant invention is shown in FIGURE 7.

The schematic illustration of FIGURE 7 shows the use of the sweep control device 70 of FIGURE 6 disposed within an envelope 90 of an Aiken-type cathode ray tube. It will be noted that the control device 70 is electrically connected between one end of each of the vertical deflection plates 92 of an Aiken-type tube and ground. The sweep control device is provided with the variable density light filter as described in connection with the description of FIGURE 6. The retrace control device 70' of the arrangement is electrically connected between the other end of each of the vertical deflection plates 92 and the B+ voltage. This device 70' is similar to the control device 70 with the exception of the variable density filter.

In the operation, it is necessary to initially cause the vertical deflection plates 92 to reach their full high voltage, for example approximately 16,000 volts and subsequent thereto to discharge the plates in an overlapping manner. This is accomplished by illuminating the light source of the control device 70' such that the resistances of the various radiation responsive elements decrease, allowing the plates 92 to achieve their full voltage. Then, the light source is extinguished causing the resistance values of the radiation responsive elements to return to their initial high value. The voltage of the deflection plates will remain due to the high resistance of the radiation responsive elements of the retrace control device 70' and the sweep control device 70.

In order for the deflection plates 92 to become more negative in value with respect to the electron beam so as to cause the beam to be deflected, the plates must be discharged. To achieve this result, the light source of the control device 70 is illuminated. Due to the fact that a variable density filter is interposed between the light source and the radiation responsive elements, the effect on varying the resistances of the elements will be such that the resistance of the topmost one will begin to decrease first. Just prior to the instance the first element reaches its minimum resistance value allowing its associated deflection plate 92 to become fully discharged therethrough to ground, the next adjacent element commences to decrease in resistance and so on until the entire array of elements have decreased in resistance an amount sufficient to allow the associated deflection plates to become fully discharged. Then, the energization of the light source is ceased completing a complete raster and the resistance values of the radiation responsive elements increase to their original value and the system is ready to repeat its cycle.

According to the provisions of the patent statutes, I have explained the principles and mode of operation of my invention, and have illustrated and described what I now consider to represent its best embodiment. However, I desire to have it understood that, within the scope of the appended claims, the invention may be practiced otherwise than as specifically illustrated and described.

What is claimed is:

1. A control device for controlling the resistance to the flow of current in a plurality of electrical circuits comprising an array of light radiation responsive elements, each of which has a variable resistance to the flow of electrical current responsive to the application of different light intensities thereto, a light source common to said elements selectively operable to provide a variable light output including a layer of electroluminescent material disposed between a pair of conducting members at least one of which is transparent, a variable density filter disposed adjacent said light source for controlling the intensity of the light emitted from said source which impinges on said array, input means for coupling variable signals to said source to vary the light output thereof, and means for connecting each element of said array in associated electrical circuits.

2. A control device for controlling the resistance to the flow of current in a plurality of electrical circuits comprising a plurality of light radiation responsive elements, each of which has a variable resistance to the flow of electrical current responsive to the application of different light intensities thereto, a light source selectively operable to provide a variable light output disposed common to said elements, variable density filter means disposed between said source and said elements to control the intensity of the light of said source which impinges on said elements, the different portions of said filter disposed between the source and different ones of said elements having a different density value, means for connecting the radiation responsive elements in associated electrical circuits, and input means for coupling variable signals to said source to vary the light output thereof and thereby the intensity of the light applied over said filter means to said radiation responsive elements.

3. A solid state control device for controlling the resistance to the flow of current in associated electrical circuits comprising a first layer including a plurality of separate light radiation responsive elements, each of which has a variable resistance to the flow of electrical current responsive to the application of different light intensities thereto, a second layer comprised of a filter of variable density at different points along its length disposed in adjacent relation to said radiation responsive elements, a third layer comprised of an electroluminescent cell disposed adjacent said filter to apply the light output of the cell over said light filter to said radiation responsive elements, and means for coupling variable value signals to sid electroluminescent cell to control same to privide a variable light output to said elements.

4. In a control arrangement, a plurality of branch circuits, a first control device for establishing a predetermined value of voltage over each of said circuits comprising a plurality of radiation responsive elements, each of which is connected to a corresponding one of said branch circuits to initially establish a first value of voltage therein responsive to the application of a light intensity of a predetermined value thereto; and a second control device for effecting in sequence a decrease of the voltage thus established in each of said circuits comprising a plurality of light radiation responsive elements, each of which has a variable resistance in response to the application of different light, intensities thereto, a variable light source, input means for coupling variable signals to said source to vary the light output thereof, and a variable density light filter for controlling the amount of light impingement on each of said elements, different sections of said filter having different densities to effect application of different light intensities to the respective radiation responsive elements for each value of light intensity output by said light source.

5. A control device for controlling the resistance to the flow of current in a plurality of electrical circuits comprising a plurality of light radiation responsive elements, each of which has a variable resistance to the flow of electrical current responsive to the application of different light intensities thereto, means for supporting said elements in a circular pattern, a light source selectively adjustable to provide a variable light output disposed within said circular pattern and common to said elements, input means for coupling signals to said source to vary the light output thereof relative to said elements, and means for connecting the light radiation responsive elements in associated electrical circuits to vary the resistance of the circuits an amount related to the change in the value of the input signals coupled over said input means.

6. A control device for controlling the resistance to current flow in an electrical circuit comprising a housing, at least one light radiation responsive element disposed in said housing which has a variable resistance to the flow of electrical current responsive to the application of different light intensities thereto, a light source in said housing for selectively providing a light output of variable intensity, input means for coupling variable signals to said light source to vary the light output thereof, filter means disposed in said housing between said radiation responsive element and said light source for modifying the intensity of the radiation output of the source which is applied to said element, and means for connecting the light radiation responsive element in an electrical circuit for circuit control purposes.

7. A control device for controlling the resistance to the flow of current in a plurality of electrical circuits comprising a plurality of light radiation responsive elements, each of which has a variable resistance to the flow of electrical current responsive to the application of different light intensities thereto, means for supporting said elements in an annular pattern, a light source selectively operable to provide a variable intensity light output, variable density filter means disposed between said light source and said radiation responsive elements to control the intensity of the light of said source which is applied to said elements, different segments of said filter means having different densities than other segments thereof, input means for coupling variable signals to said source to vary the light output of the source and means connecting the light radiation responsive elements in associated electrical circuits.

8. A control device for controlling the resistance to the flow of current in a plurality of electrical circuits comprising a light confining housing including a plurality of light radiation responsive elements disposed in a circular pattern, each of which has a variable resistance to the flow of electrical current responsive to the application of different light intensities thereto, a circular-shaped electroluminescent light source means disposed common to and centrally of said elements selectively operable to adjust the intensity of the light which impinges on each of said elements, input means for coupling variable signals to said source to vary the light output thereof relative to said elements, and means for connecting the light radiation responsive elements in associated electrical circuits.

9. A control device for controlling the resistance to the flow of current in a plurality of electrical circuits comprising a housing including a plurality of light radiation responsive elements, each of which has a variable resistance to the flow of electrical current responsive to the application of different light intensities thereto, means for supporting said elements in an annular pattern within said housing, means extending exteriorly of the housing for connecting said elements in associated circuits, a light source selectively controllable to provide a variable light output disposed within said housing and said annular pattern, input means for coupling variable signals to said source to vary the light output thereof, and a variable density filter means disposed between said source and said elements to control the intensity of the light of said source applied to the different ones of said elements.

10. In an electrical control circuit, a plurality of branch circuits, a first control device for effecting the establishment of a predetermined voltage in each of the circuits comprising a light radiation responsive element which has a variable resistance to the flow of electrical current responsive to the application of different light intensities, means for coupling said elements to each of said branch circuits, and light source means operable to provide a light intensity to said element of a value to establish said predetermined voltage in said circuit and a second control device for effecting a decrease in the voltage thus established in each of said circuits comprising a plurality of radiation responsive elements, each of which has a variable resistance to the flow of electrical current responsive to the application of different light intensities thereto, light source means for varying the amount of light impinging on said elements and means for connecting said plurality of radiation responsive elements to said branch circuits to control the value of voltage in said branch circuits, different elements being connected to different circuits, and means for controlling different light intensities to impinge on different ones of said elements for each value of light output of said source.

References Cited in the file of this patent

UNITED STATES PATENTS

| | | |
|---|---|---|
| 1,889,431 | Berg et al. | Nov. 29, 1932 |
| 2,140,799 | Kucher | Dec. 20, 1938 |
| 2,244,507 | Thomas | June 3, 1941 |
| 2,302,554 | Kingsbury | Nov. 17, 1942 |
| 2,302,874 | Lion | Nov. 24, 1942 |
| 2,370,000 | Best | Feb. 20, 1945 |
| 2,480,134 | Harrington | Aug. 30, 1949 |
| 2,484,323 | Sweet | Oct. 11, 1949 |
| 2,534,932 | Kuan-Han Sun | Dec. 19, 1950 |
| 2,604,601 | Menzel | July 22, 1952 |
| 2,719,236 | Soltis | Sept. 27, 1955 |
| 2,721,808 | Roberts et al. | Oct. 25, 1955 |
| 2,861,206 | Fiore et al. | Nov. 18, 1958 |
| 2,836,766 | Halsted | May 27, 1958 |
| 2,904,696 | Elliott et al. | Sept. 15, 1959 |

OTHER REFERENCES

Marshall, Jr., Byron O.: Optical Elements for Computers, pages 159–163, May 2 and 3, 1952, Proceedings of the Ass'n. of Computing Machinery.